(12) United States Patent
Osakabe et al.

(10) Patent No.: US 7,738,146 B2
(45) Date of Patent: Jun. 15, 2010

(54) IMAGE READING DEVICE (75) Inventors: Yoshinori Osakabe, Seto (JP); Takashi Ohama, Iwakura (JP); Tetsuya Kato, Chiryu (JP); Hirofumi Oguri, Nagoya (JP); Yoichi Horaguchi, Tajimi (JP); Tatsuya Sato, Ichinomiya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 995 days.

(21) Appl. No.: 11/459,573

(22) Filed: Jul. 24, 2006

(65) Prior Publication Data
US 2007/0019249 A1 Jan. 25, 2007

(30) Foreign Application Priority Data
Jul. 25, 2005 (JP) ............................. 2005-213915

(51) Int. Cl.
*H04N 1/04* (2006.01)
(52) U.S. Cl. ...................... 358/497; 358/483; 358/482; 358/474
(58) Field of Classification Search ................ 358/497, 358/494, 474, 483, 482, 505, 512–514; 399/211, 399/212; 250/208.1, 234–236
See application file for complete search history.

(56) References Cited

U.S. PATENT DOCUMENTS

| 5,012,354 | A | * | 4/1991 | Tsuchiya | .................... 358/474 |
| 5,801,851 | A | * | 9/1998 | Sheng | ........................ 358/497 |
| 6,594,037 | B1 | | 7/2003 | Takahashi | |
| 6,762,864 | B2 | * | 7/2004 | Kao | ........................... 358/497 |
| 7,180,641 | B2 | * | 2/2007 | Chang et al. | ................ 358/497 |
| 7,355,763 | B2 | * | 4/2008 | Furihata | .................... 358/474 |
| 2003/0053148 | A1 | | 3/2003 | Matsumoto | |

FOREIGN PATENT DOCUMENTS

| JP | 1993323230 A | 12/1993 |
| JP | 1997292580 A | 11/1997 |
| JP | 2000138803 A | 5/2000 |
| JP | 2003092661 A | 3/2003 |
| JP | 2004054156 A | 2/2004 |

* cited by examiner

*Primary Examiner*—Cheukfan Lee
(74) *Attorney, Agent, or Firm*—Baker Botts L.L.P.

(57) ABSTRACT

An image reading device has a CIS unit. The CIS unit is held by a carriage. A compression coil spring that presses the CIS unit toward a contact glass plate is disposed between the bottom surface of the carriage and the bottom surface of the CIS unit. An extension coil spring that pulls the CIS unit toward the carriage is attached between the bottom surface of the carriage and the center portion of the CIS unit.

16 Claims, 10 Drawing Sheets

IMAGE READING DEVICE

CROSS-REFERENCE TO RELATED APPLICATIONS

This Nonprovisional application claims priority under 35 U.S.C. §119(a) on Patent Application No. 2005-213915 filed in Japan on Jul. 25, 2005, the entire contents of which are hereby incorporated by reference.

BACKGROUND

The present invention relates to the structure of an image reading device employed, for example, for a multi unction device (MFD).

Copying machines and multi function devices are typically provided with an image reading device for reading images on the original to get image data. The image reading device has an image sensor such as a charge coupled device (CCD) or a contact image sensor (CIS). And images on the original are read as image data by such an image sensor scanning the original.

Figure 1:
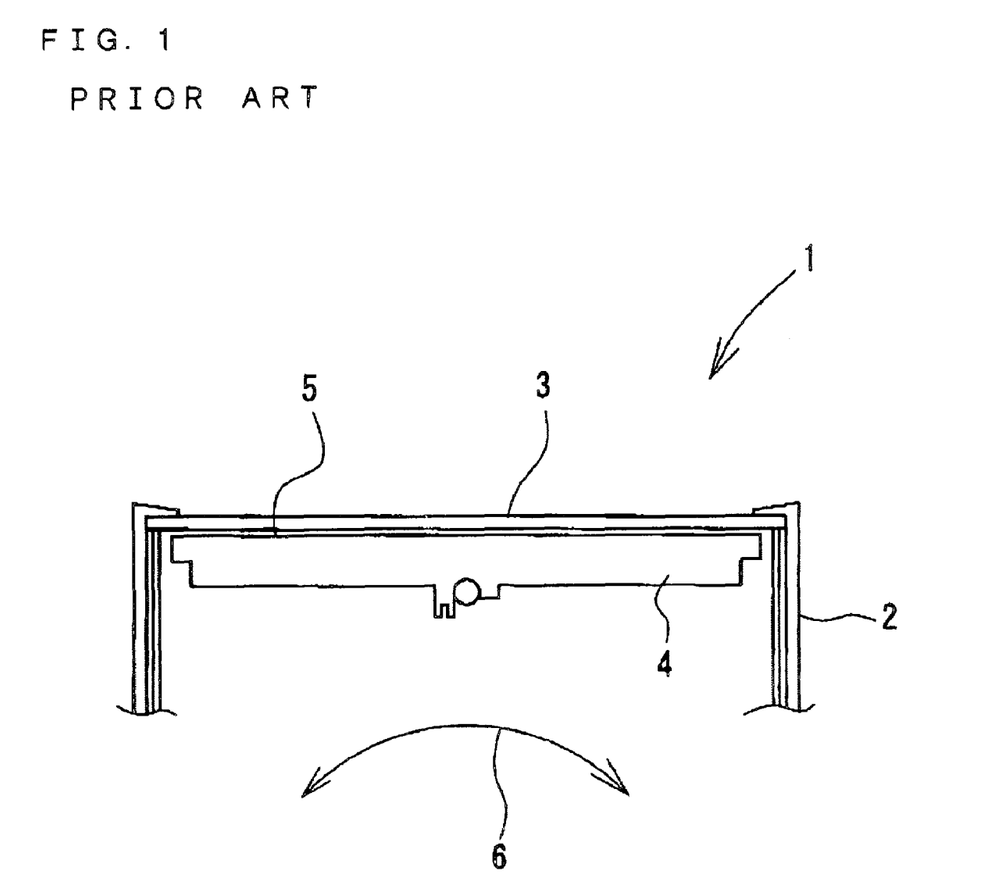
FIG. 1 is a cross-sectional view of the main part of the conventional image reading device.

FIG. 1 is a cross-sectional view of the main part of a conventional image reading device, and schematically shows the structure of the image reading device. As shown in FIG. 1, the image reading device 1 has a box-shaped body frame 2. A contact glass plate 3 is provided on the top surface of the body frame 2, and the contact glass plate 3 constitutes the original table where the original is placed. Inside the body frame 2, a contact image sensor 4 is disposed. The contact image sensor 4 is disposed inside the body frame 2 so that the top surface 5 thereof faces upward. That is, the contact image sensor 4 is disposed immediately below the contact glass plate 3, and the top surface 5 of the contact image sensor 4 and the rear surface of the contact glass plate 3 are opposed to each other with a constant gap. The contact image sensor 4 reads the image from the original placed on the contact glass plate 3 while being moved in a direction vertical to the plane of FIG. 1.

Contact image sensors generally have a characteristic that the depth of field is small, and it is therefore necessary that the contact image sensor 4 be situated close to the contact glass plate 3 in order to perform excellent image reading. Further, it is important that the gap between the top surface 5 of the contact image sensor 4 and the rear surface of the contact glass plate 3 be always the same. This is because if the gap changes, since the depth of field of the contact image sensor 4 is small, the image cannot be excellently read from the original. However, there are cases where the gap changes for various reasons such as an early deformation (mainly, a deformation in the direction of the arrow 6) of the contact image sensor 4 or a posture change of the contact image sensor 4 while the contact image sensor 4 is being moved. Therefore, various improvements have previously been made to suppress the deformation of the contact image sensor 4 (or example, see Japanese Laid-Open Patent Applications Nos. 2003-92661, H9-292580, H5-323230, 2000-138803 and 2004-54156).

SUMMARY

Conventionally, to suppress the deformation of the contact image sensor, the rigidity of the contact image sensor has been improved and means has been proposed for correcting the caused deformation and securing the contact image sensor so that the deformation is not restored. However, there are cases where a vibration or a shock is exerted on the contact image sensor during the transportation of the image reading device as a product. Moreover, there are cases where the contact glass plate is pressed down when a book as the original is read out. In such cases, it is important that the contact image sensor be displaceable with respect to the body frame. This is because if the contact image sensor cannot be displaced with respect to the body frame, the contact image sensor can be damaged by the above-mentioned shock or by the contact glass plate being pressed down.

Accordingly, it is an object to provide an image reading device excellent in shock absorbance and capable of excellent image reading.

To attain the above-mentioned object, an image reading device according to a first aspect is an image reading device comprising: an original table on a surface of which an original is placed; an image sensor that is disposed opposed to a rear surface of the original table and is provided with: a light source; and light receiving elements linearly arranged in one direction; a holder that holds the image sensor so as to be abuttable on the rear surface of the original table and is movable along the rear surface of the original table in a direction vertical to the one direction; a pressing unit that is disposed between the image sensor and the holder and presses the image sensor toward the rear surface of the original table; and a pulling unit that is disposed between the image sensor and the holder and pulls a center portion in the one direction of the image sensor toward the holder.

The image sensor has the light source and the light receiving elements. The image sensors is held by the holder. The light source and the light receiving elements are disposed opposed to the rear surface of the original table. By the holder being moved along the rear surface of the original table, the image sensor scans the original placed on the surface of the original table.

Since the image sensor is abuttable on the rear surface of the original table and the pressing unit is disposed between the image sensor and the holder, the image sensor is pressed against the rear surface of the original table at ordinary times, and when an external force acts against the pressing force in a direction opposite to the pressing direction, the image sensor separates from the original table. Consequently, when a shock or other external forces act on the image reading device (typically, when a shock is exerted during the transportation of the image reading device or when the original table is strongly pressed together with a book as the original), the image sensor separates from the rear surface of the original table to be prevented from being damaged. Further, since the image sensor has the pulling unit, the center portion of the image sensor is pulled toward the holder at ordinary times. Consequently, the center portion, in one direction, of the image sensor separates from the rear surface of the original table, whereby the light source and the light receiving elements are prevented from being in contact with the rear surface of the original table.

According to the first aspect, the shock exerted on the image sensor is absorbed by the pressing unit and the contact between the light source and light receiving elements of the image sensor and the original table is prevented by the pulling unit, so that the distance between the image sensor and the rear surface of the original table is maintained fixed. Consequently, damage of the image sensor during the transportation of the image reading device is prevented, and highly accurate image reading is realized.

The above and further objects and features will more fully be apparent from the following detailed description with accompanying drawings.

DETAILED DESCRIPTION OF THE EXEMPLARY EMBODIMENTS

Hereinafter, preferred embodiments will be described in detail with reference to the drawings as appropriate.

First Embodiment

Figure 2:
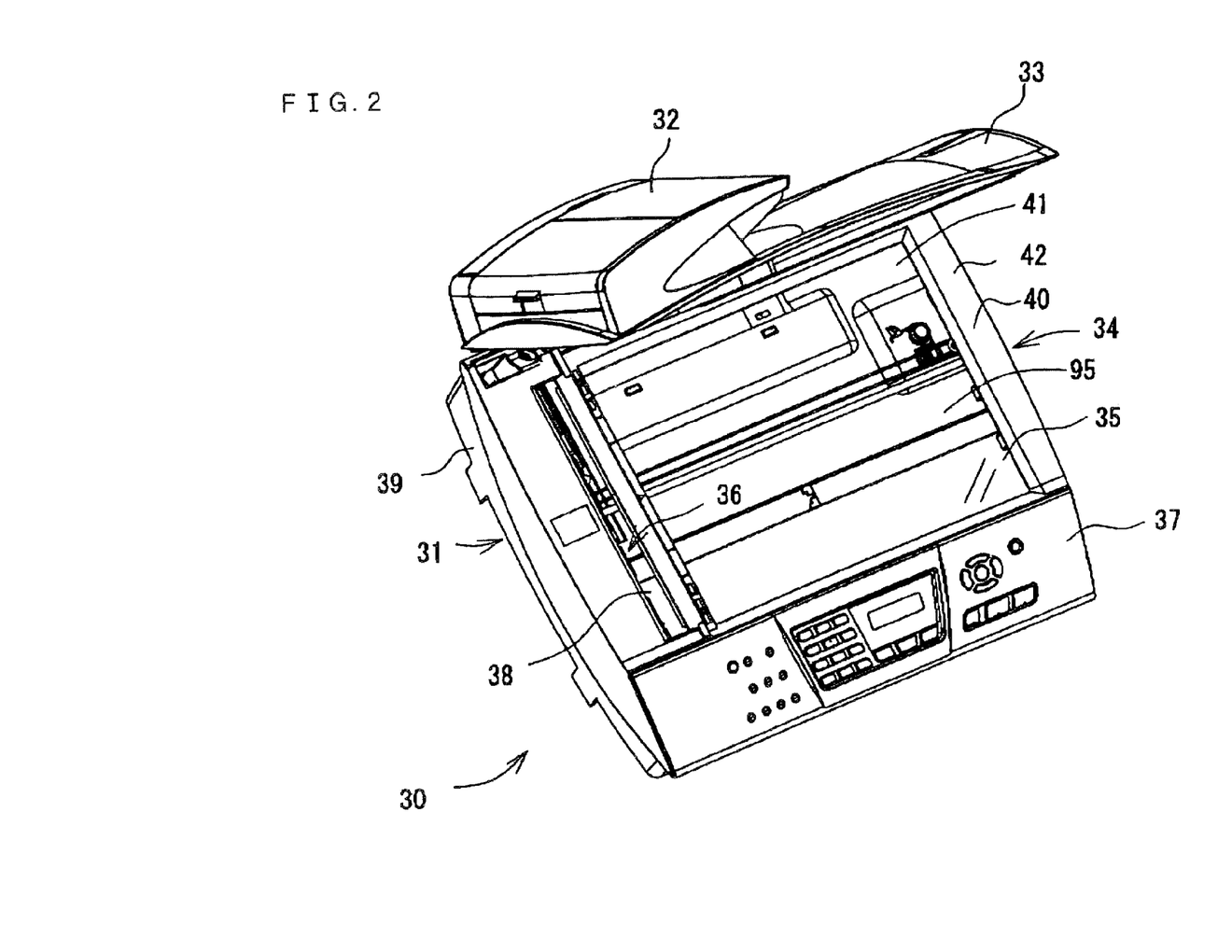
FIG. 2 is an external perspective view of an image reading device according to a first embodiment.

FIG. 2 is an external perspective view of an image reading device 30 according to a first embodiment.

The image reading device 30 is usable, for example, as the scanner unit of a multi function device having a printer function and a scanner function integrally or as the image reading unit of a copying machine. Here, the above-mentioned printer function is an arbitrary mechanism, and for example, the image reading device 30 may be formed as a flatbed scanner (FBS) having only the scanner function.

As shown in FIG. 2, the image reading device 30 has a reading section 31 that functions as an FBS, and an original cover 33 is openably and closably attached to the reading section 31. The original cover 33 has an auto document feeder (ADF) 32. The reading section 31 has a body frame 34 having a substantially rectangular parallelepiped shape, a contact glass plate 35 (original table) provided on the top surface (upper surface) of the body frame 34, and an image reading unit 36 incorporated in the body frame 34. The original is placed on the contact glass plate 35. When the original cover 33 is closed, the original is fixed by the original cover 33. The image is read from the original by the image reading unit 36 moving along the contact glass plate 35 below the contact glass plate 35.

On the front side of the reading section 31, an operation panel 37 is provided. The operation panel 37 has various operation buttons and a liquid crystal display. The image reading device 30 operates by instructions from the operation panel 37. When the image reading device 30 is formed as an MFD, a personal computer and the like can be connected to the image reading device 30. In that case, the image reading device 30 is operable not only by instructions from the operation panel 37 but also by instructions sent from the computer through the scanner driver or the like.

As mentioned above, the original cover 33 has the ADF 32 that continuously conveys the original from the original tray to the paper output tray. In the conveyance process by the ADF 32, the original passes a platen 38, and the image reading unit 36, positioned below the platen 38, reads the image from the original. It is to be noted that the ADF 32 may be omitted in the present embodiment.

Figure 3:
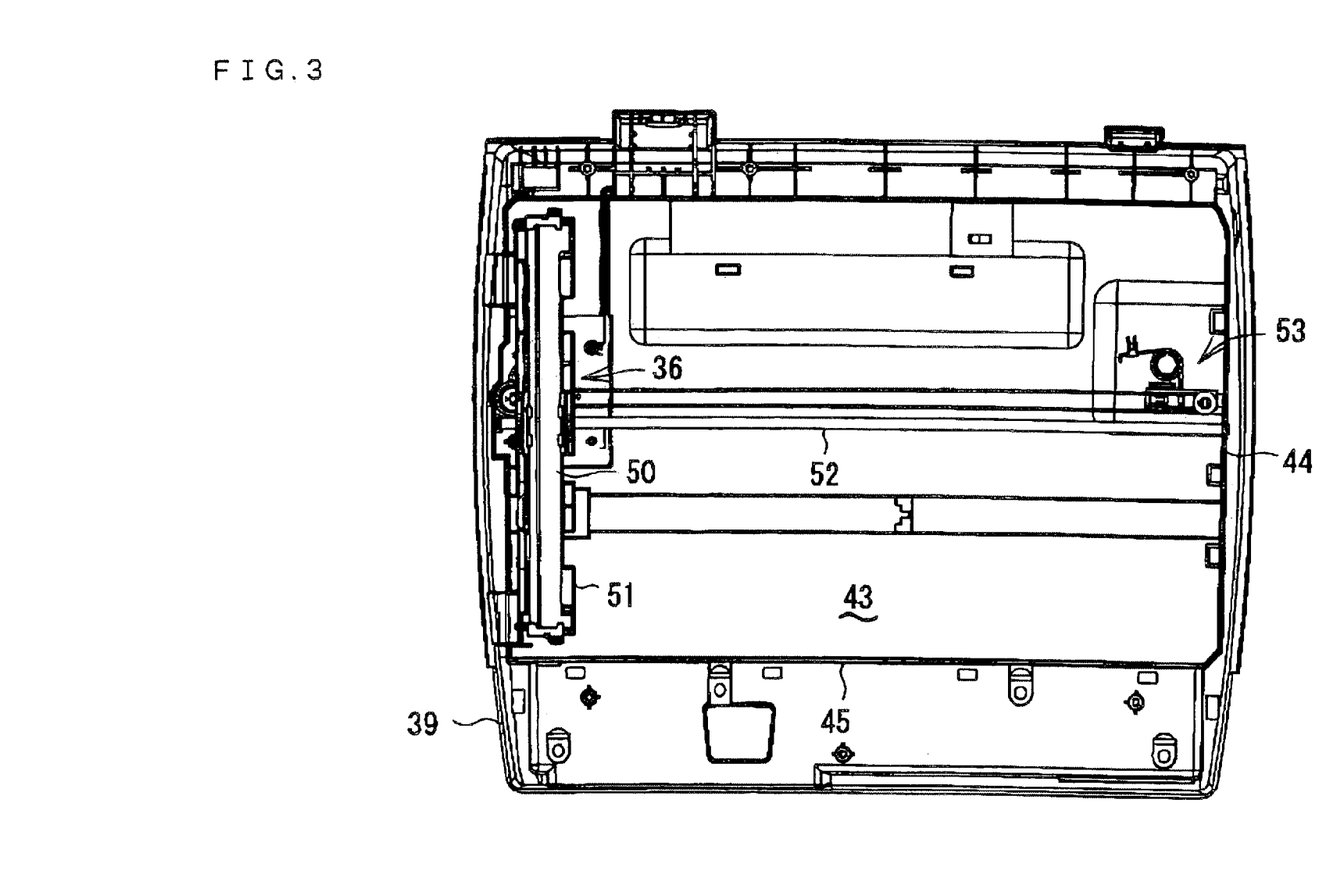
FIG. 3 is a plan view of a reading section of the image reading device according to the first embodiment.
Figure 4:
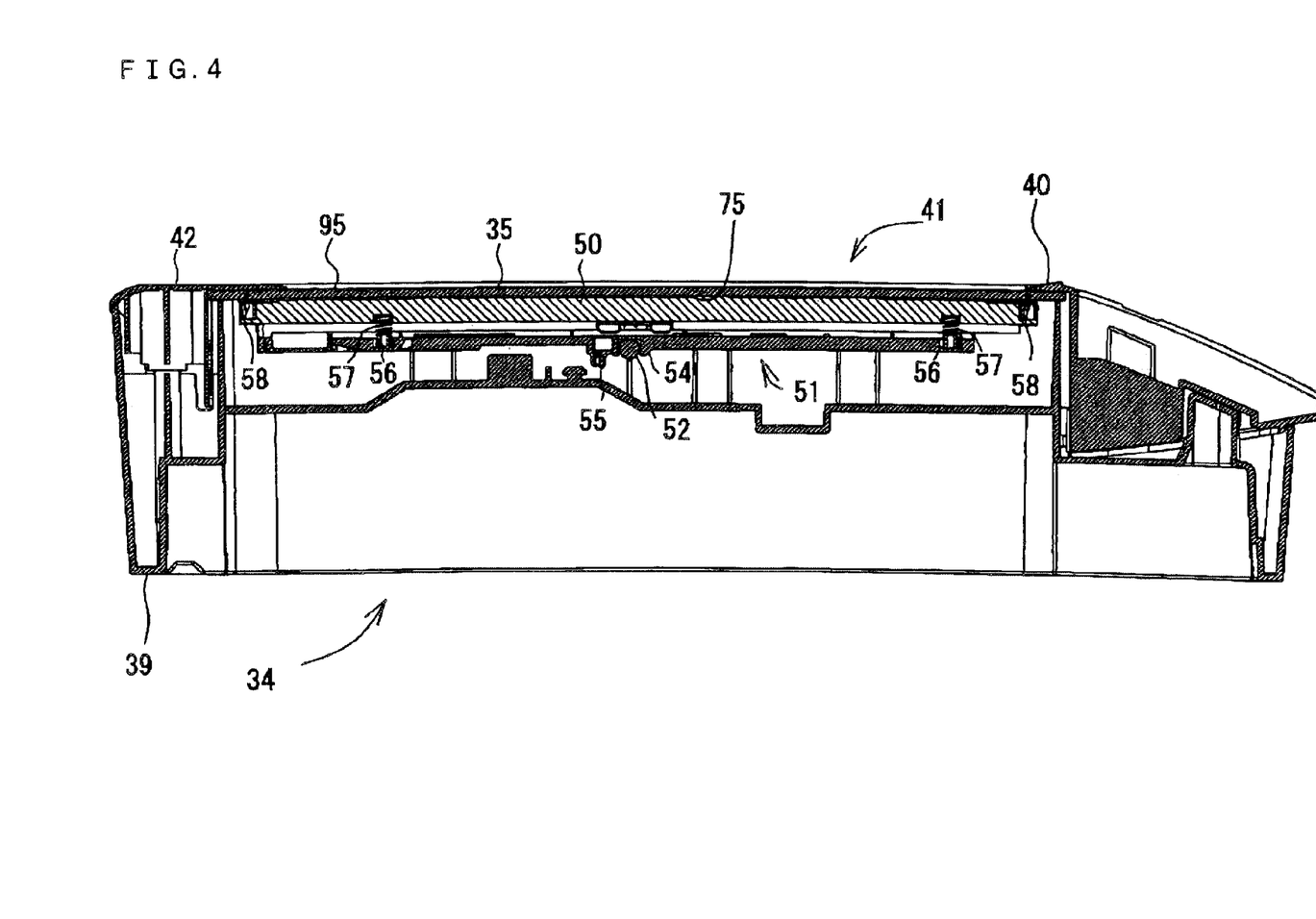
FIG. 4 is a cross-sectional view of the reading section of the image reading device according to the first embodiment.

FIG. 3 is a plan view of the reading section 31, and shows the internal structure of the reading section 31. FIG. 4 is a cross-sectional view of the reading section 31.

As shown in FIGS. 2 and 4, the body frame 34 of the reading section 31 has: a container-shaped lower frame 39 that is open at the top; and an upper cover 42. The upper cover 42 is fitted on the lower frame 39 to thereby form the body frame 34. An opening 41 is provided in the upper surface 40 of the upper cover 42. The contact glass plate 35 is attached to the upper cover 42 so as to be exposed out of the opening 41.

As shown in FIG. 3, the image reading unit 36 is disposed in the lower frame 39. The lower frame 39 and the upper cover 42 are both made of a synthetic resin. The lower frame 42 has: a base 43 constituting the bottom plate; a side wall 44 that rises from the periphery of the base 43; and a partitioning plate 45, and these are integrally formed. The partitioning plate 45 partitions into a part where the image reading unit 36 is disposed and a part where the circuit board of the operation panel 37 and the like are disposed. The lower frame 39 has: a support rib for supporting the contact glass plate 35; bosses for screwing various members; and through holes for electric wire, flat cable and the like. Since these are designed as appropriate according to the embodiment of the reading section 31, detailed descriptions thereof awe omitted.

As shown in FIG. 3; the image reading unit 36 has a CIS unit 50 (image sensor), a carriage 51 (holder), a guide shaft 52, and a belt driving mechanism 53. The image reading unit 36 has roller units 58 not shown in FIG. 3 (see FIG. 4). The CIS unit 60 is a so-called contact image sensor. The CIS unit 50 emits light to the original, receives the light reflected from the original, and converts the received light into electric signals. The CIS unit 50 has a casing 70 having an elongate rectangular parallelepiped shape as described later in detail, and the casing 70 is fitted in the carriage 51. The carriage 51 moves below the contact glass plate 35 (see FIG. 2).

Specifically, the carriage 51 is engaged with the guide shaft 52 provided so as to hang across the lower frame 39 in the width direction thereof. The carriage 51 slides on the guide shaft 52 by being driven by the belt driving mechanism 53. The carriage 51 presses the CIS unit 50 so as to be in close contact with the contact glass plate 35 while holding it. The means for pressing the carriage 51 will be described later. The CIS unit 50 held by the carriage 51 is moved along the contact glass plate 35 in the direction of the shorter side of the casing 70. Here, the "direction of the shorter side" is a direction orthogonal to the direction of the length (one direction) of the casing 70 and along the lower surface of the contact glass plate 35.

As shown in FIG. 4, the carriage 51 is provided with the CIS unit 50. As shown in FIG. 4, the CIS unit 60 is held on the upper side of the carriage 51. On the lower surface of the carriage 51, a shaft receiver 54 is formed that is engaged so as to cross the guide shaft 52 from above. The shaft receiver 54 and the guide shaft 52 are engaged with each other, and the carriage 51 is slidable in the axial direction of the guide shaft 52 in a condition of being supported by the guide shaft 52. On a side of the shaft receiver 54, a belt grasper 55 is provided in a downwardly protruding condition. The belt grasper 55 grasps a later described timing belt 61 of the belt driving mechanism 53. Thereby, the timing belt 61 and the carriage 51 are coupled together. By a driving force being transmitted from the belt driving mechanism 53 to the carriage 51, the carriage 51 moves on the guide shaft 52.

The roller units 58 are provided on both sides of the CIS unit 50. The roller units 58 abut on the rear surface 75 of the contact glass plate 35. As the carriage 51 moves, the roller units 58 roll on the rear surface 75 of the contact glass plate 35 in the direction of movement of the carriage 51. Consequently, the CIS unit 50 moves along the contact glass plate 35 with the movement of the carriage 51 while abutting on the rear surface 75 of the contact glass plate 35. In other words, the roller units 58 assist the CIS unit 50 in moving smoothly with a constant gap between the top surface of the CIS unit 50 and the rear surface 75 of the contact glass plate 35.

Figure 5:
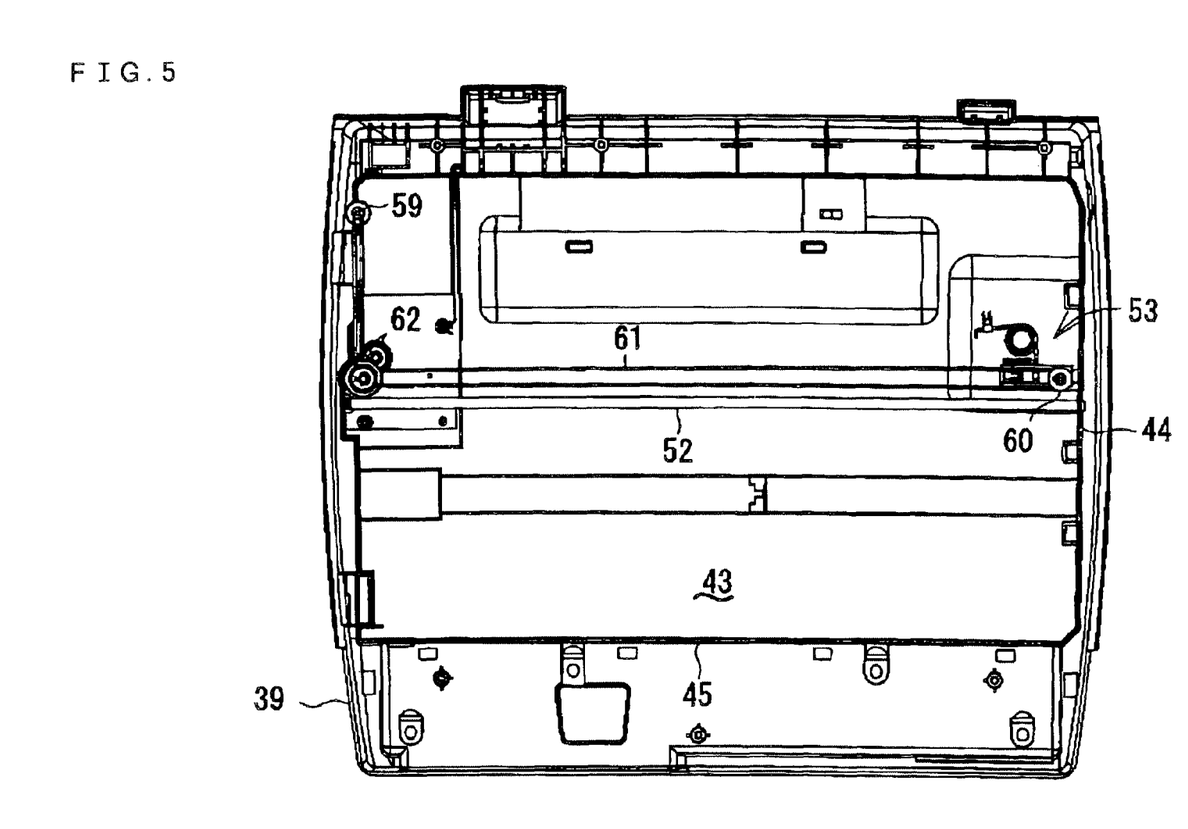
FIG. 5 is a plan view of the reading section of the image reading device according to the first embodiment, and shows the structure of a belt driving mechanism.

FIG. 5 is a plan view of the reading section 31, and shows the schematic structure of the belt driving mechanism 53.

As shown in FIG. 5, the belt driving mechanism 53 has a driving pulley 59, a driven pulley 60, the timing belt 61 wound therebetween, and a non-illustrated motor. The timing belt 61 is an endless belt having teeth formed on the inside thereof. The timing belt 61 is rotated by the motor rotating the driving pulley 59.

As shown in FIG. 5, the driving pulley 59 is disposed on the left back side inside the lower frame 39. The timing belt 61 wound around the driving pulley 59 extends toward the front side of the lower frame 39, and is wound around an intermediate pulley 62 disposed upstream of the guide shaft 52. Further, the timing belt 61 bends substantially perpendicularly, extends along the guide shaft 52 toward the right end of the lower frame 39, and is wound around the driven pulley 60 disposed near the right end of the lower frame 39. That is, the timing belt 61 is provided so as to hang substantially in an L-shape as shown in FIG. 5. The part from the driven pulley 60 to the intermediate pulley 62, that is, the part along the guide shaft 52 of the timing belt 61 wound as described above is grasped by the belt grasper 55 (see FIG. 4) of the carriage 51 whereby the timing belt 61 and the carriage 51 are coupled together. It is to be noted that as the timing belt 61, a non-endless belt having both ends thereof fixed to the carriage 51 may be used as well as an endless belt.

Figure 6:
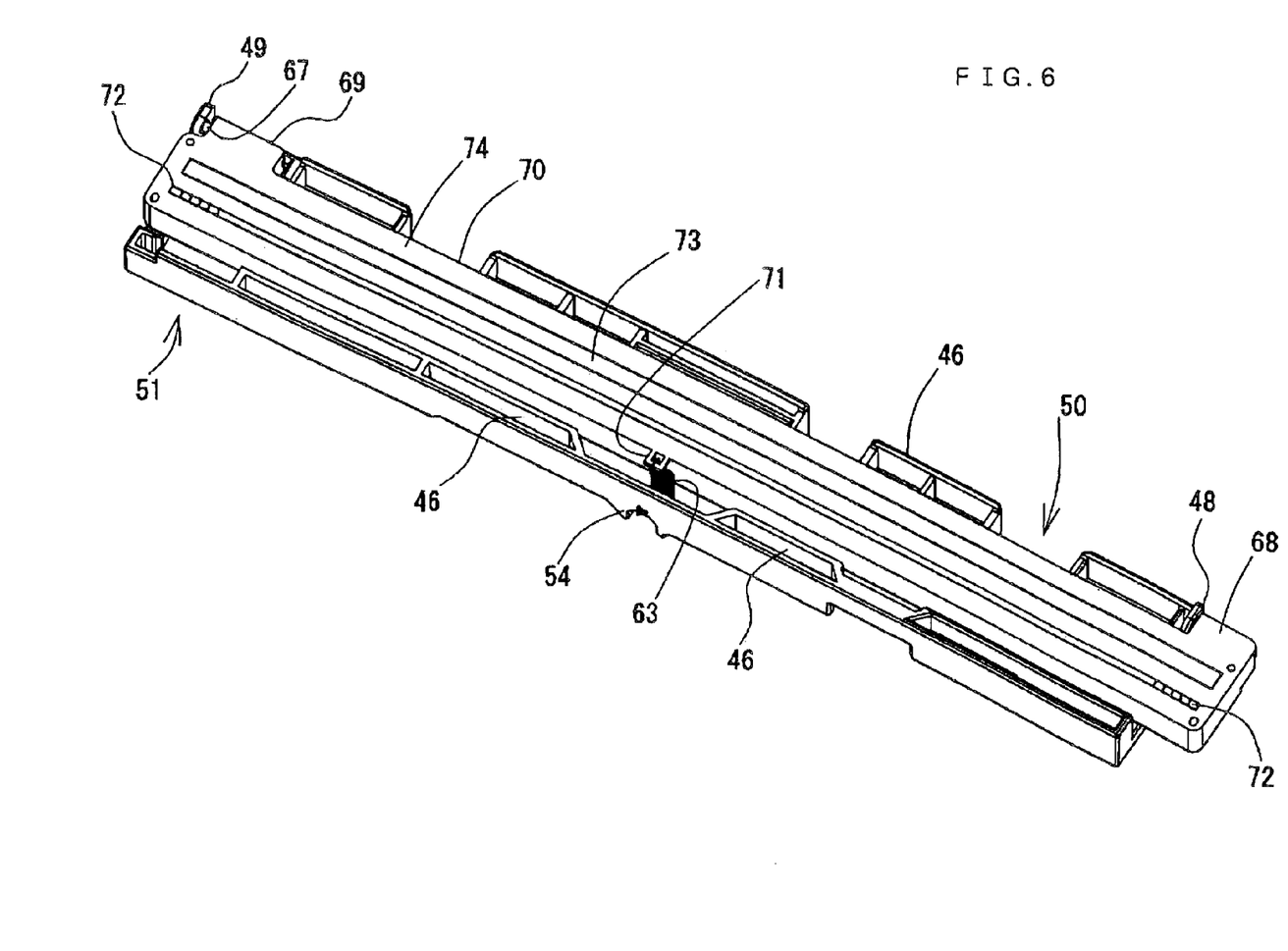
FIG. 6 is an enlarged perspective view of a CIS unit and a carriage of the image reading device according to the first embodiment.
Figure 7:
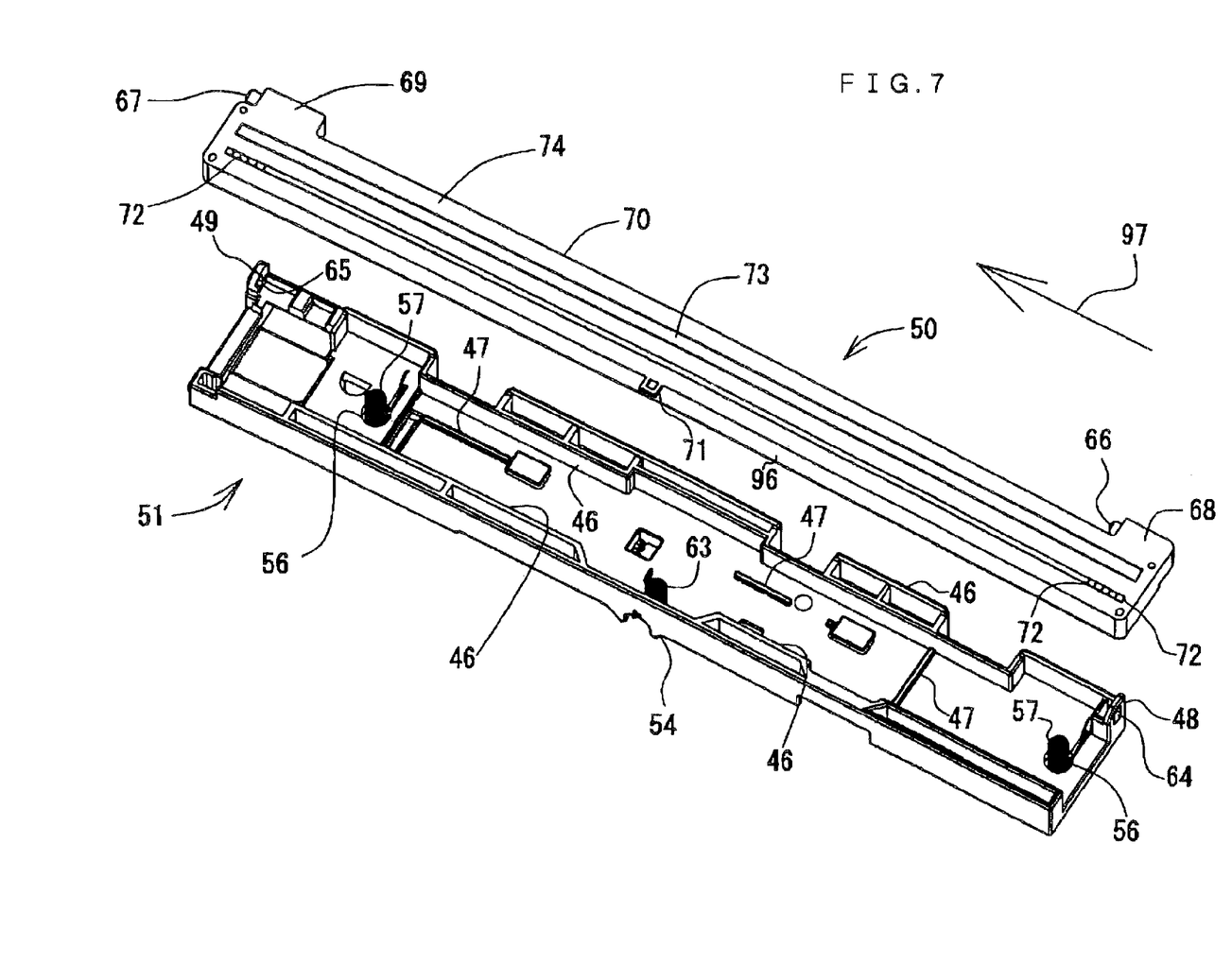
FIG. 7 is an enlarged exploded perspective view of the CIS unit and the carriage of the image reading device according to the first embodiment.

FIG. 6 is an enlarged perspective view of the CIS unit 50 and the carriage 51, and FIG. 7 is an enlarged exploded perspective view thereof. It is to be noted that the roller units 58 are not shown in FIGS. 6 through 10.

As shown in FIGS. 4 and 7, the carriage 51 is made of, for example, a resin, and has a container shape that is open at the top. The carriage 51 has a required rigidity in order to stably hold the CIS unit 50 (see FIG. 7). Specifically, ribs 46 and 47 are integrally formed on the side wall and bottom surface of the carriage 51. Moreover, latch portions 48 and 49 are integrally provided in the corners on the back side of the carriage 51. The latch portions 48 and 49 have through holes 64 and 65 that pass therethrough in the direction of the length. The holes 64 and 65 extend vertically. That is, the holes 64 and 65 are formed as elongate holes extending in a direction toward and away from the contact glass plate 35. Latch pins 66 and 67 of the CIS unit 50 are fitted in the holes 64 and 65.

Spring bearings 56 are formed on the bottom surface inside the carriage 51. The spring bearings 56 are formed in two positions on the right and left of the carriage 51. The spring bearings 56 hold compression coil springs 57 (pressing means) while positioning them. That is, the compression coil springs 57 are interposed between the CIS unit 50 and the carriage 51, and by the compression coil springs 57, the CIS unit 50 is resiliently pressed toward the contact glass plate 35 as described later. Moreover, an extension coil spring 63 (pulling means) is attached in the substantial center portion of the bottom surface inside the carriage 51. The extension coil spring 63 is coupled to the substantial center portion of the carriage 51 and the substantial center portion of the CIS unit 50. That is, the extension coil spring 63 is interposed between the CIS unit 50 and the carriage 51, and by the extension coil spring 63, the substantial center portion of the CIS unit 50 is resiliently pulled toward the carriage 51 as described later.

The CIS unit 50 has the casing 70, a light source provided in the casing 70, and light receiving elements.

The casing 70 is made of, for example, a synthetic resin, and has an elongate rectangular parallelepiped shape as shown in FIG. 7. The casing 70 incorporates the light source and the light receiving elements. As shown in FIG. 4, the top surface 74 of the casing 70 is opposed to the rear surface 75 of the contact glass plate 35. Consequently, the light source and the light receiving elements are also closely opposed to the rear surface 75 of the contact glass plate 35.

The light source typically has a light emitting diode (LED) and a light guide 73. Although not shown in FIG. 7, the LED is disposed on the back side of the inside of the casing 70. The light guide 73 is typically made of a transparent synthetic resin, and extends along the entire length of the casing 70. The light guide 73 is exposed out of the top surface 74 of the casing 70, and the light emitted from the LED is directed to the entire length of the casing 70 by the light guide 73. Consequently, the light emitted from the LED is substantially evenly dispersed to the entire length of the casing 70 to be applied to the original.

In the present embodiment, the casing 70 has the plurality of light receiving elements. The light receiving elements are juxtaposed in the direction of the length of the casing 70 on the bottom surface inside the casing 70. The light receiving elements each have a condenser lens 72. The condenser lenses 72 are exposed out of the top surface 74 of the casing 70. The light applied to the original and reflected therefrom is condensed by the condenser lenses 72 and received by the corresponding light receiving elements. These light receiving elements are photoelectric conversion elements, and output electric signals based on the light reception. The electric signals are the image signals of the image shown in the original. Later, image data of the image is made up based on the image signals.

The casing 70 has the latch pins 66 and 67. The latch pins 66 and 67 extend in the direction of the length along the side surface on the back side of the casing 70. The latch pins 66 and 67 are provided in a protruding condition on bases 68 and 69 formed on the side surface on the back side. A spring latch portion 71 is provided in the substantial center portion of the casing 70. The spring latch portion 71 having an annular shape protrudes toward a side surface 96 continuously from the top surface 74 of the casing 70. The extension coil spring 63 is hitched to the spring latch portion 71.

Therefore, the latch pins 66 and 67 are aligned with the holes 64 and 65 formed in the latch portions 48 and 49 of the carriage 51, and is then slid in the direction of the arrow 97, thereby engaging with the holes 64 and 65. Under this condition, the CIS unit 50 is rotatable about the latch pins 66 and 67, and is capable of changing its position between a position where the CIS unit 50 is rising with respect to the carriage 51 and a position where it is lying with respect to the carriage 51 with the latch pins 66 and 67 as the center of rising and lying. Further, since the holes 64 and 65 are elongate, the latch pins 66 and 67 are vertically slidable, so that the CIS unit 50 can come into contact with and separate from the contact glass plate 35 while the top surface 74 thereof is held parallel to the rear surface 75 of the contact glass plate 35.

In other words, when the CIS unit 50 slides upward with respect to the carriage 51, the CIS unit 50 is close to the contact glass plate 35 and the roller units 58 abut on the rear surface 75 of the contact glass plate 35 (abutting condition), and when the CIS unit 50 slides downward with respect to the carriage 51, the CIS unit 50 is separate from the rear surface 75 of the contact glass plate 35 (separating condition). In the present embodiment, as mentioned above, the CIS unit 60 is resiliently pressed by the compression coil springs 57 so as to be in the abutting condition, and is resiliently pressed by the extension coil spring 63 so as to be in the separating condition. Here, since the spring force of the compression coil springs 57 is larger than that of the extension coil spring 63, at ordinary times, the CIS unit 50 is in the abutting condition as shown in FIG. 4.

The image reading device 30 according to the present embodiment reads the image from the original in the following manner: First, the original is placed on the surface 95 of the contact glass plate 35 (see FIG.) The belt driving mechanism 53 is activated to move the carriage 51 along the rear surface 75 of the contact glass plate 35. Thereby, the CIS unit 50 scans the original placed on the surface of the contact glass plate 35.

As mentioned above, while the CIS unit 50 is resiliently pressed against the rear surface 75 of the contact glass plate 35 by the compression coil springs 57 at ordinary times, since the CIS unit 50 is capable of changing its condition between the abutting condition and the separating condition (see FIG. 7), if an external force acts against the resilience of the compression coil springs 57, the latch pins 66 and 67 slide with respect to the holes 64 and 65, and the CIS unit 50 separates from the contact glass plate 35. Therefore, for example, when a shock is exerted during the transportation of the image reading device 30 or when the contact glass plate 35 is strongly pressed downward together with a book as the original, the CIS unit 50 is displaced in the separating direction, so that damage due to the shock or the like can be prevented. Further, since the CIS unit 50 has the extension coil spring 63, the substantial center portion of the CIS unit 50 is resiliently pulled toward the carriage 51 at ordinary times. For this reason, the substantial center portion of the CIS unit 50 is displaced in the separating direction from the rear surface 75 of the contact glass plate 36 at ordinary times, so that the light guide 73 and the condenser lenses 72 of the CIS unit 50 are prevented from being in contact with the contact glass plate 35.

That is, in the image reading device 30 according to the present embodiment, the shock-exerted on the image sensor is absorbed by the compression coil springs 57, and the contact between the light guide 73 and condenser lenses 72 of the CIS unit 50 and the contact glass plate 35 is prevented by the extension coil spring 63, so that the distance (gap) between the CIS unit 50 and the rear surface 75 of the contact glass plate 35 is maintained fixed. Consequently, damage of the CIS unit 50 during the transportation of the image reading device 30 as a product and during the image reading operation is prevented, and highly accurate image reading is realized.

As shown in FIG. 7, particularly in the present embodiment, the extension coil spring 63 is disposed in the substantial center portion of the CIS unit 50, and the compression coil springs 57 are disposed on both sides of the extension coil spring 63 and at both ends of the CIS unit 50. Thereby, the deformation of the casing 70 caused because the CIS unit 50 is pressed is prevented with reliability, so that the distance (gap) between the CIS unit 50 and the rear surface 75 of the contact glass plate 35 is more constant.

Moreover, according to the present embodiment, since the compression coil springs 57 are adopted as the means for pressing the CIS unit 50 against the contact glass plate 35 and the extension coil spring 63 is adopted as the means for pulling the substantial center portion of the CIS unit 50, the pressing means and the pulling means are formed inexpensively. Moreover, since the compression coil springs 57 and the extension coil spring 63 are extremely simple in structure, the CIS unit 50 is pressed and pulled with reliability. In addition, while in the present embodiment, the spring latch portion 71 to which the extension coil spring 63 is coupled is provided only at one end of the casing 70 (see FIG. 7), the spring latch portion 71 may be provided also at the other end of the casing 70. Here, the "substantial center portion" includes not only the complete center but also any part it is close to the center and capable of performing a similar function.

Second Embodiment

Next, a second embodiment will be described.

Figure 8:
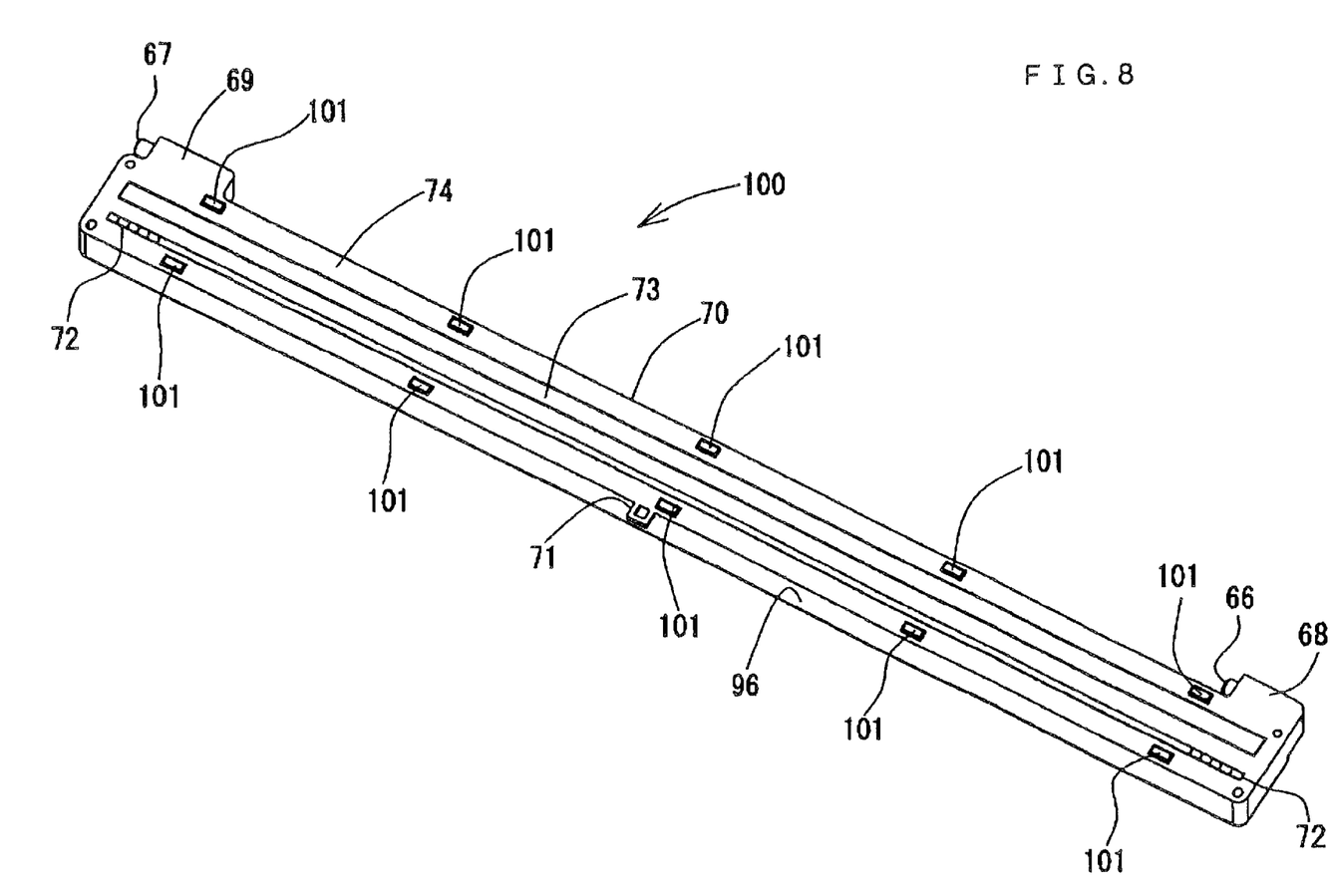
FIG. 8 is an enlarged perspective view of the main part of an image reading device according to a second embodiment.

FIG. 8 is an enlarged perspective view of the main part of an image reading device according to a second embodiment, and is a perspective view of a CIS unit 100 according to the present embodiment.

The image reading device according to the present embodiment is different from the image reading device 30 according to the first embodiment in that protecting units 101 are provided on the top surface 74 of the casing 70 as shown in FIG. 8. Except this, the structure is similar to that of the first embodiment.

The protecting units 101 are formed of fine block-form protrusions. The protecting units 101 are formed integrally with the casing 70, and protrude upward from the top surface 74 of the casing 70. In the present embodiment, ten protecting units 101 are evenly spaced on the edges of the top surface 74. The number of protecting units 101 is not limited to ten, but is necessary only that the protecting units 101 be provided at least in the substantial center portion of the edges of the top surface 74. The height of the protecting units 101 with reference to the top surface 74 is larger than those of the light guide 73 and the condenser lenses 72. However, the height of the protecting units 101 with reference to the top surface 74 is smaller than the constant gap described above.

As described above, according to the present embodiment, since the protecting unit 101 are provided on the opposed surface (the top surface 74) opposed to the rear surface 75 of the contact glass plate 35, when the condition of the CIS unit 100 is changed to the abutting condition, the protecting units 101 abut on the contact glass plate 35, so that the contact between the light guide 73 and the condenser lenses 72, and the contact, glass plate 35 is avoided. Consequently, damage of the light guide 73 aid the condenser lenses 72 is prevented, so that excellent image reading by the CIS unit 100 is ensured.

In addition, by adopting the protrusions as described above as the protecting units 101 the area of contact between the protecting units 101 and the contact glass plate 35 is small. Consequently, the frictional force caused between the protecting units 101 and the contact glass plate 35 is small, which enables smooth movement (scanning) of the CIS unit 100.

In particular, when the protecting units 101 are provided only in the substantial center portion of the top surface 74 of the casing 70, the functional force is extremely small, so that a smoother movement of the CIS unit 100 it realized. Further, even in a case where the casing 70 is curvedly deformed sot that the substantial center portion thereof is close to the contact glass plate 35 under a condition where the CIS unit 100 is attached to the body frame 34, the upper ends of the protecting units 101 abut on the contact glass plate 35 with reliability when the CIS unit 100 is pressed against the rear surface 75 of the contact glass plate 35. Consequently, the contact between the light guide 73 and the condenser lenses 72, and the contact glass plate 35 is avoided so that damage of the light guide 73 and the condenser lenses 72 is prevented.

Next, a modification of the present embodiment will be described.

Figure 9:
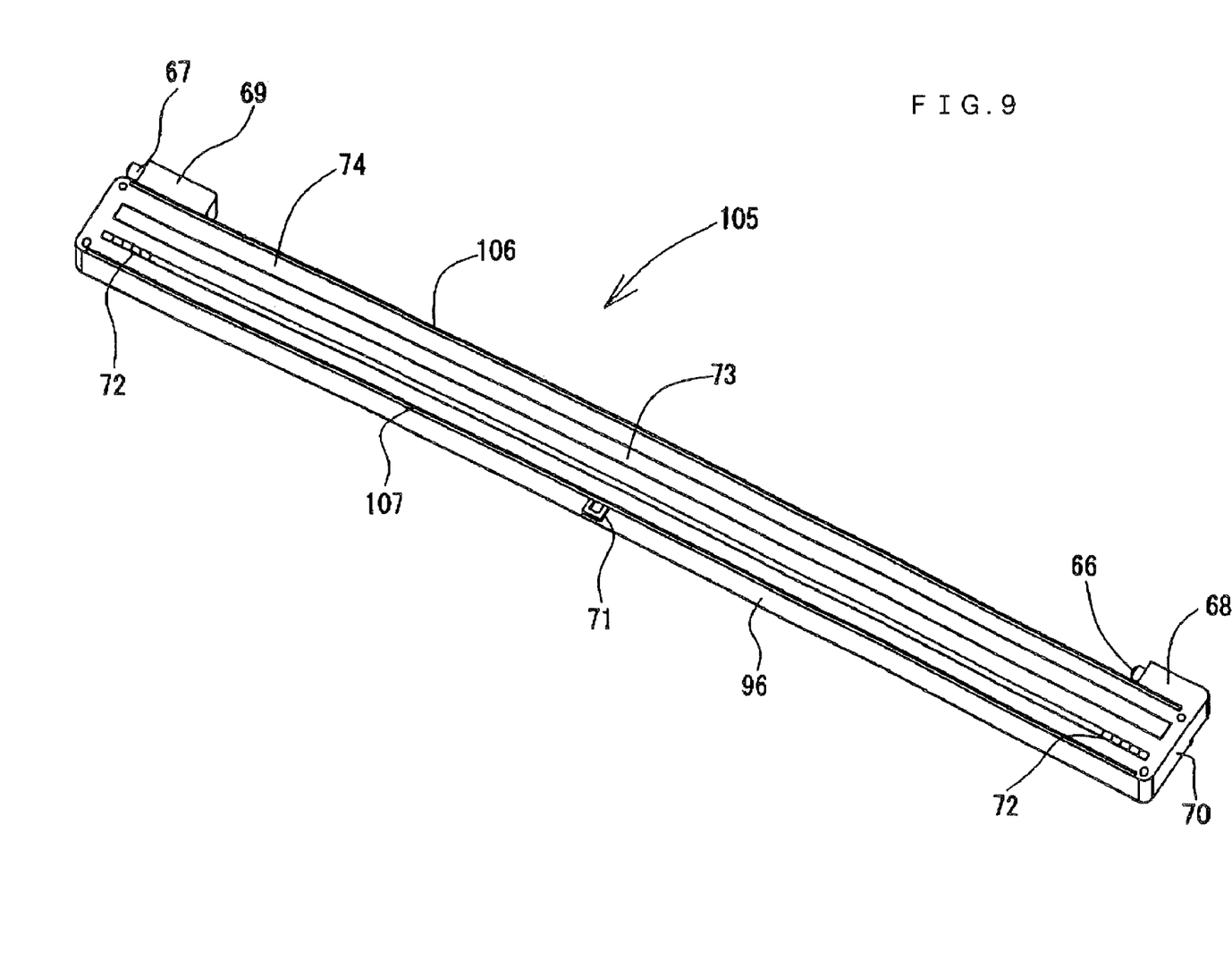
FIG. 9 is a perspective view of a CIS unit according to a first modification of the present embodiment.

FIG. 9 is a perspective view of a CIS unit 105 according to a first modification of the present embodiment.

The CIS unit 105 according to the present modification is different from the CIS unit 100 according to the second embodiment in that while the protrusion-form protecting units 101 are provided on the top surface 74 of the casing 70 in the CIS unit 100, a pair of wall members 106 and 107 (protecting units) are provided on the top surface 74 in the present modification. Except this, the structure is similar to that of the second embodiment.

The wall member 106 is provided along one edge (the edge on the back side) in the direction of the length of the top surface 74. The wall member 107 is provided along the other edge (the edge on the front side) of the top surface 74. The height of the wall members 106 and 107 is larger than those of the light guide 73 and the condenser lenses 72 similarly to the height of the protecting units 101 according to the second embodiment. And the height of the wall members 106 and 107 is smaller than the constant gap described above.

According to the present modification, since the wall members 106 and 107 abut on the contact glass plate 35 when the CIS unit 105 is pressed against the rear surface 75 of the contact glass plate 35, the contact between the light guide 73 and the condenser lenses 72, and the contact glass plate 35 is avoided. Consequently, damage of the light guide 73 and the condenser lenses 72 is prevented, so that excellent image reading by the CIS unit 105 is ensured.

Next, another modification of the present embodiment will be described.

Figure 10:
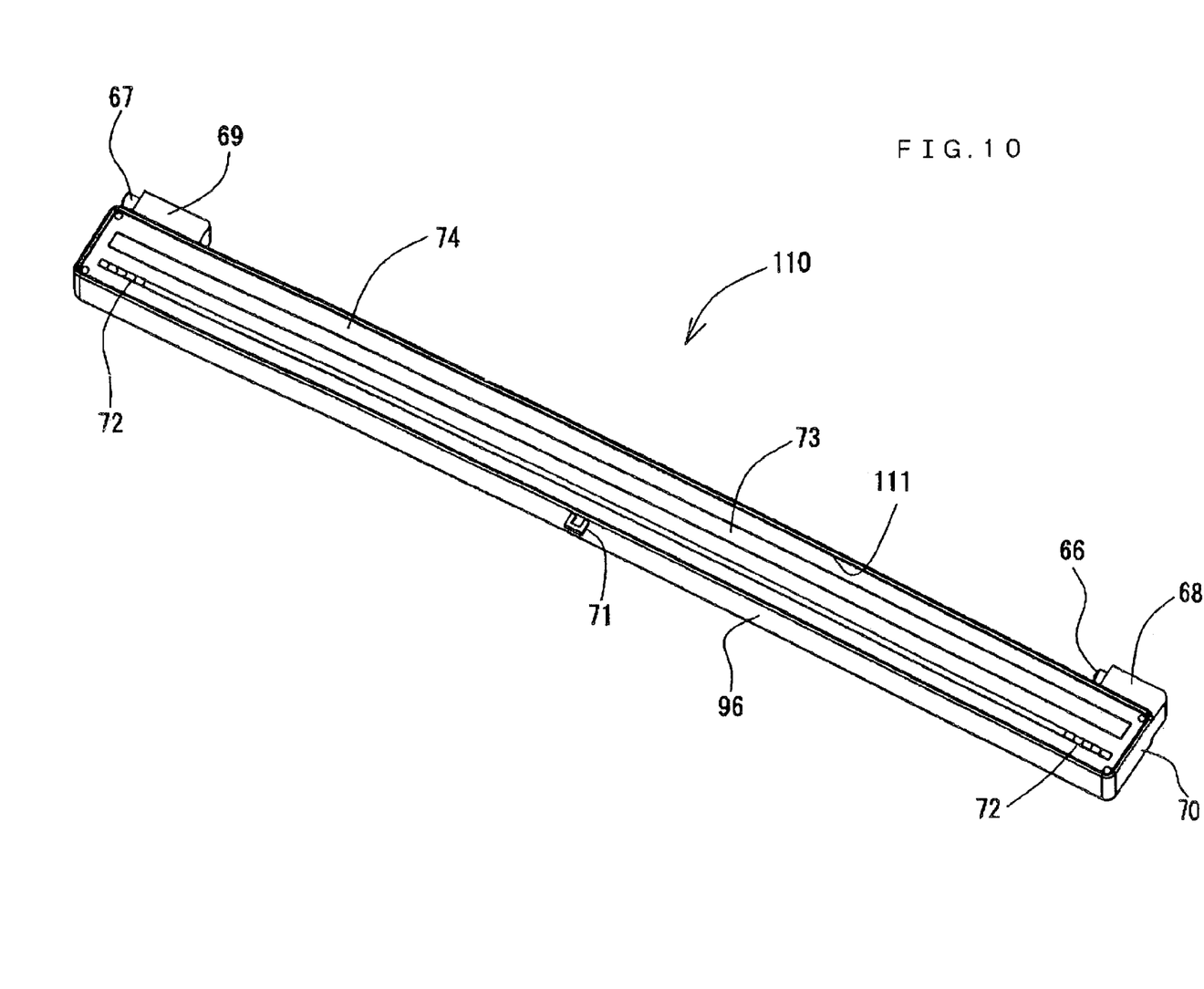
FIG. 10 is a perspective view of a CIS unit according to a second modification of the present embodiment.

FIG. 10 is a perspective view of a CIS unit 110 according to a second modification of the present embodiment.

The CIS unit 110 according to the present modification is different from the CIS unit 100 according to the second embodiment in that while the protrusion-form protecting units 101 are provided on the top surface 74 of the casing 70 in the CIS unit 100, a frame member 111 (protection portion) is provided on the top surface 74 in the present modification. Except this the structure is similar to that of the second embodiment.

The frame member 111 is annularly formed around the periphery of the top surface 74. The height of the frame member 111 is larger than those of the light guide 73 and the condenser lenses 72 similarly to the height of the protecting units 101 according to the second embodiment. And the height of the frame member 111 is smaller than the constant gap described above.

According to the present modification, since the upper end of the frame member 111 abuts on the contact glass plate 35 when the CIS unit 110 is pressed against the rear surface 75 of the contact glass 35, the contact between the light guide 73 and the condenser lenses 72, and the contact glass plate 35 is avoided. Consequently, damage of the light guide 73 and the condenser lenses 72 is prevented, so that excellent image reading by the CIS unit 110 is ensured.

While in the first embodiment, the extension coil spring 63 (see FIG. 7) is provided so that the substantial center portion of the CIS unit 50 is not directly in contact with the contact glass plate 35, this structure is provided in consideration of a deformation of the casing 70 of the CIS unit 50 when the casing 70 is molded or the CIS unit 50 is attached. Moreover, in the second embodiment and the modifications thereof, the protecting units 101 or the like are provided so that the contact between the light guide 73 and the condenser lenses 72, and the contact glass plate 35 is avoided. Therefore, the casing 70 may be molded in a deformed shape in advance so that the contact between the CIS unit 50 and the like, and the contact glass plate 35 is avoided. Specifically, the casing 70 may be molded so that the substantial center portion is lower than both ends (so as to be concave as a whole).

The present embodiment is applicable to the image reading device employed for copying machines and multi function devices.

As this description may be embodied in several forms without departing from the spirit of essential characteristics thereof, the present embodiment is therefore illustrative and not restrictive, since the scope is defined by the appended claims rather than by the description preceding them, and all changes that fall within metes and bounds of the claims, or equivalence of such metes and bounds thereof are therefore intended to be embraced by the claims.

What is claimed is:

1. An image reading device comprising:
 an original table on a surface of which an original is placed;
 an image sensor that is disposed opposed to a rear surface of the original table and is provided with:
  a light source; and
  light receiving elements linearly arranged in one direction;
 a holder that holds the image sensor so as to be abuttable on the rear surface of the original table and is movable along the rear surface of the original-table in a direction vertical to the one direction;
 a pressing unit that is disposed between the image sensor and the holder and presses the image sensor toward the rear surface of the original table; and
 a pulling unit that is disposed between the image sensor and the holder and always pulls a center portion in the one direction of the image sensor toward the holder.

2. The image reading device according to claim 1, wherein the pulling unit is disposed in the center portion in the one direction of the image sensor; and the pressing unit is disposed at both ends in the one direction of the image sensor.

3. The image reading device according to claim 1, wherein the pressing unit comprises a compression coil spring disposed between the image sensor and the holder, and the pulling unit comprises an extension coil spring disposed between the image sensor and the holder.

4. The image reading device according to claim 1, further comprising a protecting unit that is disposed on an opposed surface, opposed to the rear surface of the original table, of the image sensor, and abuts on the rear surface of the original table when the image sensor is in an abutting condition to thereby avoid a contact between the light source and the light receiving elements, and the original table.

5. The image reading device according to claim 4, wherein the protecting unit is a frame member that is provided on a peripheral portion of the opposed surface and whose height is larger than heights of the light source and the light receiving elements.

6. The image reading device according to claim 4, wherein the protecting unit is a wall member that is provided along an edge in the one direction of the opposed surface and whose height is larger than heights of the light source and the light receiving elements.

7. The image reading device according to claim 4, wherein the protecting unit is a protrusion that is provided on an edge of the opposed surface and whose height is larger than heights of the light source and the light receiving elements.

8. The image reading device according to claim 7, wherein the protrusion is provided at least in a center portion of the opposed surface.

9. An image reading device comprising:
an original table on a surface of which an original is placed;
an image sensor that is disposed opposed to a rear surface of the original table and is provided with:
  a light source; and
  light receiving elements linearly arranged in one direction;
a holder that holds the image sensor so as to be abuttable on the rear surface of the original table and is movable along the rear surface of the original table in a direction vertical to the one direction;
pressing means for pressing the image sensor toward the rear surface of the original table, the pressing means being disposed between the image sensor and the holder; and
pulling means for always pulling a center portion in the one direction of the image sensor toward the holder, the pulling means being disposed between the image sensor and the holder.

10. The image reading device according to claim 9, wherein
the pulling means is disposed in the center portion in the one direction of the image sensor, and the pressing means is disposed at both ends in the one direction of the image sensor.

11. The image reading device according to claim 9, wherein
the pressing means comprises a compression coil spring disposed between the image sensor and the holder, and
the pulling means comprises an extension coil spring disposed between the image sensor and the holder.

12. The image reading device according to claim 9, further comprising a protecting unit that is disposed on an opposed surface, opposed to the rear surface of the original table, of the image sensor, and abuts on the rear surface of the original table when the image sensor is in an abutting condition to thereby avoid a contact between the light source and the light receiving elements, and the original table.

13. The image reading device according to claim 12, wherein
the protecting unit is a frame member that is provided on a peripheral portion of the opposed surface and whose height is larger than heights of the light source and the light receiving elements.

14. The image reading device according to claim 12, wherein
the protecting unit is a wall member that is provided along an edge in the one direction of the opposed surface and whose height is larger than heights of the light source and the light receiving elements.

15. The image reading device according to claim 12, wherein
the protecting unit is a protrusion that is provided on an edge of the opposed surface and whose height is larger than heights of the light source and the light receiving elements.

16. The image reading device according to claim 15, wherein
the protrusion is provided at least in a center portion of the opposed surface.

* * * * *